United States Patent
Lesner et al.

(10) Patent No.: US 10,546,348 B1
(45) Date of Patent: Jan. 28, 2020

(54) CLEANING NOISE WORDS FROM TRANSACTION DESCRIPTIONS

(71) Applicants: Christopher Lesner, Mountain View, CA (US); Alexander Ran, Palo Alto, CA (US)

(72) Inventors: Christopher Lesner, Mountain View, CA (US); Alexander Ran, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 200 days.

(21) Appl. No.: 15/408,241

(22) Filed: Jan. 17, 2017

(51) Int. Cl.
*G06Q 40/02* (2012.01)
*G06F 17/27* (2006.01)

(52) U.S. Cl.
CPC ......... *G06Q 40/02* (2013.01); *G06F 17/2775* (2013.01)

(58) Field of Classification Search
CPC .................... G06Q 40/02; G06F 17/2775
See application file for complete search history.

(56) References Cited

U.S. PATENT DOCUMENTS

| | | | | |
|---|---|---|---|---|
| 8,131,751 B1* | 3/2012 | Behzadi | ........... | G06F 16/334 707/769 |
| 2002/0107756 A1* | 8/2002 | Hammons | ........... | G06Q 30/02 705/26.3 |
| 2009/0144070 A1* | 6/2009 | Psota | ........... | G06Q 10/083 705/330 |
| 2011/0113047 A1* | 5/2011 | Guardalben | ........ | G06F 17/2785 707/754 |
| 2014/0279464 A1* | 9/2014 | Milam | ........... | G06Q 20/102 705/40 |
| 2015/0348003 A1* | 12/2015 | Reader | ........... | G06Q 20/3224 705/16 |

OTHER PUBLICATIONS

"Vadlamani Ravi, B. Shravan Kumar, A survey of the applications of text mining in financial domain, Oct. 5, 2016, Centre of Excellence in Analytics, Institute for Development and Research in Banking Technology, University of Hyderabad, India, 2016, 1-20" (Year: 2016).*

(Continued)

*Primary Examiner* — Kito R Robinson
*Assistant Examiner* — Toan Duc Bui
(74) *Attorney, Agent, or Firm* — Ferguson Braswell Fraser Kubasta PC (57) ABSTRACT

A method, system, and non-transitory computer readable medium for removing noise ngrams from transaction records. The method may include obtaining noise ngrams; ordering the noise ngrams based on frequency of occurrence; discarding a portion of the noise ngrams below a frequency threshold to obtain a higher frequency subset of the noise ngrams; obtaining a transaction record of interest; and identifying a portion of the higher frequency subset within the transaction record of interest. Identifying the portion of the higher frequency subset may include constructing a regular expression based on the higher frequency subset; constructing a finite state machine based on the regular expression; providing the transaction record of interest as an input to the finite state machine; and executing the finite state machine. The method may also include removing, based on the identification, the portion of the higher frequency subset from the transaction record of interest.

18 Claims, 6 Drawing Sheets

(56) References Cited

OTHER PUBLICATIONS

"Zheng Xiang, Zvi Schwartz, John H. Gerdes Jr., Muzaffer Uysal, What can big data and text analytics tell us about hotel guest experience and satisfaction, Jan. 2015, Virginia Tech, University of Delaware, University of South Carolina, International Journal of Hospitality Management 44, 1-11" (Year: 2015).*

* cited by examiner

SAFEWAY STORE 00000000 POS PURCHASE MERCHANT PURCHASE TERMINAL SAN FRANCISCO CA
    Transaction Record 300

SAFEWAY STORE 00000000 SAN FRANCISCO CA
    Transaction Record 302

CHECK CRD PURCHASE 00/00 SAFEWAY STORE 00000000 SAN FRANCISCO CA 000000XXXXXX0000
    Transaction Record 304

CHECK CRD PURCHASE 00/00 ALTO BEVERAGE 00000000 SAN FRANCISCO CA 000000XXXXXXxxxx000 ?MCC=0000 00
    Transaction Record 306

SAFEWAY STORE 00000000 SAN FRANC SAFEWAY STORE 0000 00X Oct 00 @ 0:00
    Transaction Record 308

SAFEWAY STORE 00000000 SAN FRANC SAFEWAY STORE 0000 00X Oct 00 @ 0:00
    Transaction Record 310

Tom's Gas 00000000 SAN FRANC 0000 00X Oct 00 @ 0:00
    Transaction Record 312

FIG. 3A

SAFEWAY STORE 00000000 POS PURCHASE MERCHANT PURCHASE TERMINAL SAN FRANCISCO CA
           Transaction Record 300

SAFEWAY STORE POS PURCHASE MERCHANT PURCHASE TERMINAL SAN FRANCISCO CA
           Transaction Record 320

SAFEWAY STORE MERCHANT PURCHASE TERMINAL SAN FRANCISCO CA
           Transaction Record 322

SAFEWAY STORE SAN FRANCISCO CA
           Transaction Record 324

SAFEWAY STORE SAN FRANCISCO CA$
           Transaction Record 326

SAFEWAY STORE
           Lower Noise Transaction Record 328

CLEANING NOISE WORDS FROM TRANSACTION DESCRIPTIONS

BACKGROUND

Transaction records often include information related to the identities of one or more parties to a transaction. For example, a transaction record may include the name of a vendor from which a customer purchased a product or service. Such a vendor may be referred to as a transaction counterparty relative to the customer, and may be identified within a transaction record that records the customer's purchase. The transaction record may be generated by the vendor, a financial institution associated with the customer, any combination thereof, or any other entity associated with the transaction. A transaction record may be provided to the customer after the transaction occurs, or to any entity related to managing and/or recording transactions (e.g., on behalf of a customer).

However, transaction records often also include a variety of additional information. Some of the additional information describes aspects of the transaction other than the parties, such as the location of the transaction, the method of payment, the amount of the sale, codes associated with a specific point-of-sale, etc. Furthermore, some of the additional information may be used by the entity causing the creation of the record (i.e., codes related to products, sales, consumers, etc.), which may be used by the entity (e.g., a vendor, a bank, etc.) for any purpose during record keeping activities.

The additional information included in a given transaction record is often difficult to recognize and/or parse when attempting to discover a counterparty in a transaction using the transaction record. The difficulty often arises from the unpredictable structure of the transaction record, which may change from transaction to transaction, from vendor to vendor, from financial institution to financial institution, etc. The difficult and varying structure of most transaction records leads to schemes for transaction counterparty identification that require significant levels of manual intervention, which may render a given scheme tedious and require significant amounts of time and effort. If the additional information (i.e., other than the transaction counterparty) could be removed or reduced when processing transaction records, then transaction counterparty identification would be improved. However, methods and systems for automatically removing such additional information, which may be referred to as noise words or noise ngrams, from transaction records do not currently exist. Thus, it is difficult to use transaction records for a wide variety of purposes that benefit from proper transaction counterparty identification.

SUMMARY

In general, in one aspect, embodiments of the invention relate to a method for removing noise ngrams from transaction records. The method may include obtaining a plurality of noise ngrams; ordering the plurality of noise ngrams based on frequency of occurrence; discarding a portion of the plurality of noise ngrams below a frequency threshold to obtain a higher frequency subset of the plurality of noise ngrams; obtaining a transaction record of interest; and identifying a portion of the higher frequency subset within the transaction record of interest. Identifying the portion of the higher frequency subset may include constructing a regular expression based on the higher frequency subset; constructing a finite state machine based on the regular expression; providing the transaction record of interest as an input to the finite state machine; and executing the finite state machine. The method may also include removing, based on the identification, the portion of the higher frequency subset from the transaction record of interest.

In general, in one aspect, embodiments of the invention relate to a system that includes a processor; a memory comprising instructions for execution on the processor; a transaction record and ngram data repository operatively connected to the memory and the processor; and a threshold analyzer operatively connected to the transaction record and ngram data repository, stored in the memory, and executing on the processor. In one or more embodiments of the invention, the threshold analyzer includes functionality to obtain a plurality of noise ngrams; order the plurality of noise ngrams based on frequency of occurrence; and discard a portion of the plurality of noise ngrams below a frequency threshold to obtain a higher frequency subset of the plurality of noise ngrams. In one or more embodiments of the invention, the system also includes a noise ngram identifier operatively connected to the threshold analyzer and the transaction record and ngram data repository, stored in the memory, and executing on the processor. In one or more embodiments of the invention, the noise ngram identifier includes functionality to obtain a transaction record of interest; identify a portion of the higher frequency subset within the transaction record of interest; remove, based on the identification, the portion from the transaction record of interest to obtain a lower noise transaction record of interest; and identify a transaction counterparty using the lower noise transaction record of interest.

In general, in one aspect, embodiments of the invention relate to a non-transitory computer readable medium that includes instructions which, when executed by a computer processor, perform a method that includes obtaining a plurality of noise ngrams; ordering the plurality of noise ngrams based on frequency of occurrence; discarding a portion of the plurality of noise ngrams below a frequency threshold to obtain a higher frequency subset of the plurality of noise ngrams; obtaining a transaction record of interest; identifying a portion of the higher frequency subset within the transaction record of interest; and removing, based on the identification, the portion from the transaction record of interest.

Other aspects of the invention will be apparent from the following description and the appended claims.

DETAILED DESCRIPTION

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for removing noise words (i.e., noise ngrams) from transaction records to facilitate transaction counterparty identification. Specifically, a given transaction record includes a sequence of text characters such as letters and numbers. Such a sequence includes any number of tokens, which are a consecutive series of characters within the sequence. Tokens are delimited within the sequence by any known delimiters, such as spaces. Any portion of the sequence may be referred to as a subsequence. Thus, any two or more tokens within a sequence may be referred to as a multi-token subsequence. A given transaction record may include a variety of tokens and multi-token subsequences, either of which may be referred to as an ngram. Some portion of these relate to the identity of a transaction counterparty. At least some of the remaining portion may be referred to as noise words, or noise ngrams. A noise ngram is any token or multi-token subsequence within a transaction record that is identified as noise, which, as used herein, refers to information not related to identifying a transaction counterparty.

To remove noise ngrams from transaction records, a set of transaction records is obtained, and a portion of the transaction records are selected that include certain ngrams which identify common distinctive transaction counterparties. A common distinctive transaction counterparty is a transaction counterparty that appears frequently within a set of transaction records (e.g., "wal-mart", "amazon", etc.). The subset of transaction records that include common distinctive transaction counterparties is analyzed to identify the various ngrams within the transaction records other than the ngrams that identify the common distinctive transaction counterparty. These other ngrams are noise ngrams.

The noise ngrams are then ordered by frequency of appearance, and a frequency threshold is applied. The noise ngrams that appear more frequently than the frequency threshold may then be used in analysis of any other transaction record when attempting to identify a transaction counterparty within the transaction record by identifying the noise ngrams within the transaction records, and removing those noise ngrams. The noise ngram removal results in a transaction record for which a transaction counterparty may be automatically recognized. Automatic recognition of transaction counterparties allows for a variety of advantages, including, but not limited to: the ability to estimate the amount of business a given merchant does, the ability to more effectively manage a budget, the ability to estimate business activity in different categories, the ability to analyze consumer spending habits, and/or the ability to target advertising more effectively.

Figure 1:
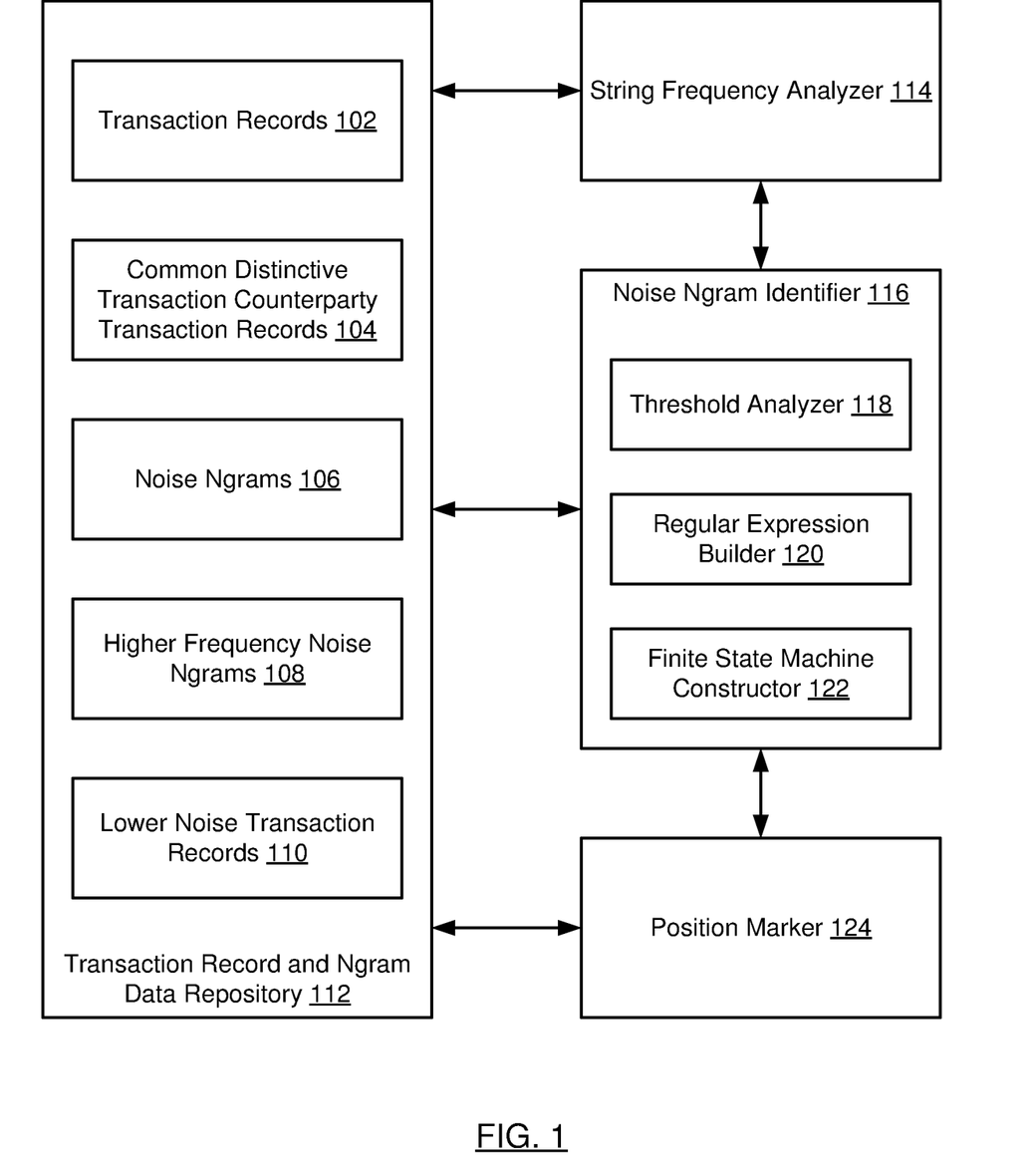
FIG. 1 shows a system in accordance with one or more embodiments of the invention.

FIG. 1 shows a system in accordance with one or more embodiments of the invention. As shown in FIG. 1, the system includes a transaction record and ngram data repository (112). The transaction record and ngram data repository (112) may include transaction records (102), common distinctive transaction counterparty transaction records (104), noise ngrams (106), higher frequency noise ngrams (108), and lower noise transaction records (110). The system shown in FIG. 1 also includes a string frequency analyzer (114), a position marker (124), and a noise ngram identifier (116). The noise ngram identifier (116) may include a threshold analyzer (118), a regular expression builder (120), and a finite state machine constructor (122). Each of these components is described below.

In one or more embodiments of the invention, the system includes a transaction record and ngram data repository (112). In one or more embodiments of the invention, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments of the invention, transaction records (102) are stored in the transaction record and ngram data repository (112). A transaction record (102) is any set of information that relates to a transaction. A transaction may be any activity between two or more entities that includes an exchange (e.g., an exchange of goods/services for money). A transaction record records various aspects of the transaction, such as a transaction counterparty, a location, a method of payment (e.g., debit card, check, credit card, etc.), a date/time, a unique reference numbers, codes associated with specific point of sale or store or user, an amount of sale, or any other transaction related information. In one or more embodiments of the invention, a transaction record is a text string that includes any number of characters (e.g., letters, numbers, etc.) of any type, and any number of delimiters (e.g., spaces, characters such as ">", etc.). As an example, the following is a transaction record recording a purchase at an electronics store:

ElectronicsINC ?MCC=485 CHK CRD $27.89 March 29 @ 12:47 POS KSK Chicago IL

In one or more embodiments of the invention, common distinctive transaction counterparty transaction records (104) are stored in the transaction record and ngram data repository (112). The common distinctive transaction counterparty transaction records (104) are a subset of the transaction records (102). The common distinctive transaction counterparty transaction records (104) are transaction records that include an ngram identifying a common distinctive transaction counterparty. A common distinctive transaction counterparty is a transaction counterparty that appears frequently within a set of transaction records (e.g., "taco bell", "verizon", etc.).

In one or more embodiments of the invention, noise ngrams (106) are stored in the transaction record and noise ngram data repository (102). As discussed above, a noise ngram is any token or multi-token subsequence within a transaction record that is identified as noise, which, as used herein, refers to information not related to identifying a transaction counterparty. Therefore, a noise ngram may refer to any ngram within a transaction record other than the identified common distinctive transaction counterparty ngrams within a set of transaction records. An example of a noise ngram is a multi-token subsequence within a transaction record is "Oct 13 @ 1:32 pm", which refers to the time at which a transaction occurred and, thus, does not identify a transaction counterparty.

In one or more embodiments of the invention, higher frequency noise ngrams (108) are stored in the transaction record and ngram data repository (102). Higher frequency noise ngrams (108) are ngrams that appear within a set of noise ngrams with a frequency above a frequency threshold. In one or more embodiments of the invention, a threshold analyzer of a noise ngram identifier (discussed below) identifies higher frequency noise ngrams.

In one or more embodiments of the invention, lower noise transaction records (110) are stored in the transaction record and noise ngram data repository (102). A lower noise transaction record, as used herein, is any transaction record for which some or all of the noise ngrams (i.e., ngrams that do not identify a transaction counterparty) are removed from the transaction record. A lower noise transaction record may facilitate automatic recognition of a transaction counterparty within the lower noise transaction record. Identification of the transaction counterparty allows for a variety of advantages, as discussed above, such as analysis of an entity's spending habits.

In one or more embodiments of the invention, the system includes a string frequency analyzer (114). A string frequency analyzer (114) is any hardware (e.g., circuitry), software, firmware, or any combination thereof that includes functionality to apply a string frequency analysis to a set of transaction records. A string frequency analyzer may be implemented (i.e., execute) on a computing device. A computing device is any device or any set of devices capable of electronically processing instructions and that includes at least the minimum processing power, memory, input and output device(s), and network connectivity in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, and/or any other mobile computing device), and/or any other type of computing device with the aforementioned minimum requirements.

In one or more embodiments of the invention, a string frequency analyzer (114) is operatively connected to the transaction record and ngram data store (112). In one or more embodiments of the invention, the string frequency analyzer (114) is directly connected to the transaction record and ngram data store. For example, the string frequency analyzer may be implemented on a computing device that has a storage interface card that is connected to an array of hard disks on which the transaction record and ngram data repository exists. In other embodiments of the invention, the string frequency analyzer is operatively connected to the transaction record and ngram data repository via a network. In one or more embodiments of the invention, a network (not shown) is a collection of one or more network devices (not shown) that facilitate network connectivity for one or more operatively connected devices (e.g., string frequency analyzer, noise ngram identifier, transaction record and ngram data repository, etc.). In one or more embodiments of the invention, the network may be all or a portion of a network. A computer network may include a datacenter network, a wide area network, a local area network, a wireless network, a cellular phone network, or any other suitable network that facilitates the exchange of information from one part of the network to another. In one or more embodiments, the network may be coupled with or overlap with the Internet.

In one or more embodiments of the invention, the system includes a noise ngram identifier (116). A noise ngram identifier (116) is any hardware (e.g., circuitry), software, firmware, or any combination thereof that includes functionality to identify noise ngrams (106), identify higher frequency noise ngrams (108), and/or remove noise ngrams from transaction records to obtain lower noise transaction records (110). A noise ngram identifier (116) may be implemented on a computing device. In one or more embodiments of the invention, the noise ngram identifier (116) is implemented on the same computing device as the string frequency analyzer (114). In other embodiments of the invention, the noise ngram identifier (116) is implemented on a separate computing device from the string frequency analyzer (114) and is operatively connected (e.g., directly, via a network, etc.) to the string frequency analyzer (114).

In one or more embodiments of the invention, the noise ngram identifier (116) is also operatively connected (e.g., directly, via a network, etc.) to the transaction record and ngram data repository (112). The noise ngram identifier (116) includes functionality to identify noise ngrams (106) by identifying all ngrams in a set of transaction records (102) other than the common distinctive transaction counterparty ngrams identified, for example, by the string frequency analyzer (114). The noise ngram identifier (114) also includes functionality to obtain transaction records of interest from any source and provide each transaction record of interest as input to a finite state machine (discussed below) in order to identify and remove higher frequency noise ngrams from the transaction record of interest.

In one or more embodiments of the invention, the noise ngram identifier (116) includes a threshold analyzer (118). A threshold analyzer (118) is any hardware (e.g., circuitry), software, firmware, or any combination thereof that includes functionality to analyze a set of noise ngrams (106) and identify a portion of the noise ngrams that occur within the set of noise ngrams above a frequency threshold, which are referred to as higher frequency noise ngrams (108). A threshold analyzer (118) may be implemented on a computing device. For example, the threshold analyzer (118) may be implemented on the same computing device as the noise identifier (116), and operate as a sub-module of the noise ngram identifier.

In one or more embodiments of the invention, the noise ngram identifier (116) includes a regular expression builder (120). A regular expression builder (120) is any hardware (e.g., circuitry), software, firmware, or any combination thereof that includes functionality to construct a regular expression using a set of identified higher frequency ngrams (108). A regular expression is a type of notation that uses a series of characters to define a search pattern that facilitates searching for patterns within a string of text characters. For example, the regular expression abc*(1|2|1|3) facilitates a search of a text string to determine if the text string includes any portion that begins with ab, ends with 1, 2, or 3, and has any zero or more instances of c between the ab and the 1, 2, or 3 (e.g., abc1, ab3, abcccccccccccccc2, etc.).

A regular expression builder (120) may be implemented on a computing device. For example, the regular expression builder (120) may be implemented on the same computing device as the noise ngram identifier (116), and operate as a sub-module of the noise ngram identifier. A regular expression builder (120) may include functionality to generate a regular expression in any programming language. Any number of regular expressions may be built to identify higher frequency noise ngrams (108) within a given transaction record.

In one or more embodiments of the invention, the noise ngram identifier (116) includes a finite state machine constructor (122). A finite state machine constructor (122) is any hardware (e.g., circuitry), software, firmware, or any combination thereof that includes functionality to construct a finite state machine for implementing one or more regular expressions.

A finite state machine is model for implementing any number of states of a system, such as a set of transaction records, where each state is a possible configuration of the system. Each state may have be associated with actions, some of which do not change the state, and others that do change the state. A finite state machine may have a start state, which represents the starting input to the finite state machine, and end state that represents a conclusion of the operation of the state machine.

As used in relation to transaction records, a given transaction record may be used as the input in the starting state of the finite state machine. The actions defining whether the transaction record remains in a state or moves to a different state are defined by the regular expression(s) built by the regular expression builder. A finite state machine constructor (122) may be implemented on a computing device. For example, the finite state machine constructor (122) may be implemented on the same computing device as the noise ngram identifier (116), and operate as a sub-module of the noise ngram identifier. A finite state machine constructor (122) may include functionality to construct a finite state machine in any programming language.

In one or more embodiments of the invention, the system includes a position marker (124). A position marker (124) is any hardware (e.g., circuitry), software, firmware, or any combination thereof that includes functionality to insert a marker into a transaction record at a given position when a transaction record is identified as including a location ngram (not shown). A location ngram is an ngram (e.g., multi-token subsequence) that includes a location (e.g., Kentucky, Houston Tex., San Francisco Calif., etc.) Such location ngrams are sometimes noise ngrams, and are sometimes part of the name of a transaction counterparty (e.g., "Tennessee Taco House"). Location ngrams that appear before ngrams that appear to identify a transaction counter party are often part of the name of the transaction counterparty, and are often at the beginning of a transaction record. Location ngrams that appear after ngrams that appear to identify a transaction counter party are often not part of the name of the transaction counterparty, and are often at the end of a transaction record. Accordingly, the position marker (124) includes functionality to insert one type of marker (e.g., ^) at the beginning of a transaction record and another type of marker (e.g., $) at the end of a transaction record when a location ngram is identified to exist within the transaction record.

A position marker (124) may be implemented on a computing device. In one or more embodiments of the invention, the position marker (124) is implemented on the same computing device as the ngram identifier (116) and/or the string frequency analyzer (114). In other embodiments of the invention, the position marker (124) is implemented on a separate computing device from the noise ngram identifier (116) and/or string frequency analyzer (114), and is operatively connected (e.g., directly, via a network, etc.) to the noise ngram identifier (116). In one or more embodiments of the invention, the position marker (124) is also operatively connected (e.g., directly, via a network, etc.) to the transaction record and ngram data repository (112).

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, the system may include modules that include functionality to search for higher frequency noise ngrams from transaction records and remove them other than the regular expression builder and finite state machine constructor, as there exist many methods for searching and editing text strings. Accordingly, embodiments of the invention should not be considered limited to the specific arrangements of components and elements shown in FIG. 1.

Figure 2A:
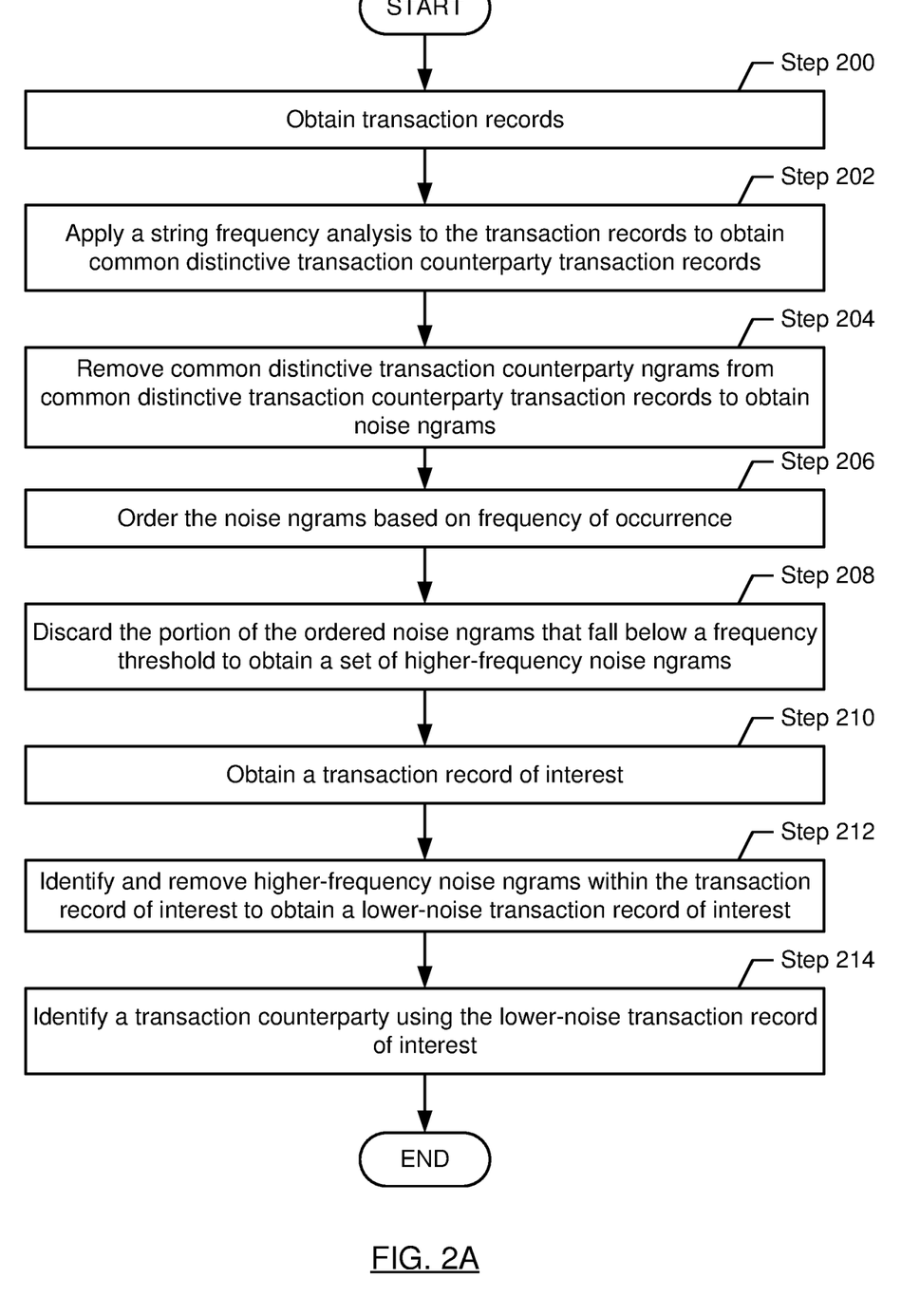
FIG. 2A shows a flowchart in accordance with one or more embodiments of the invention.
Figure 2B:
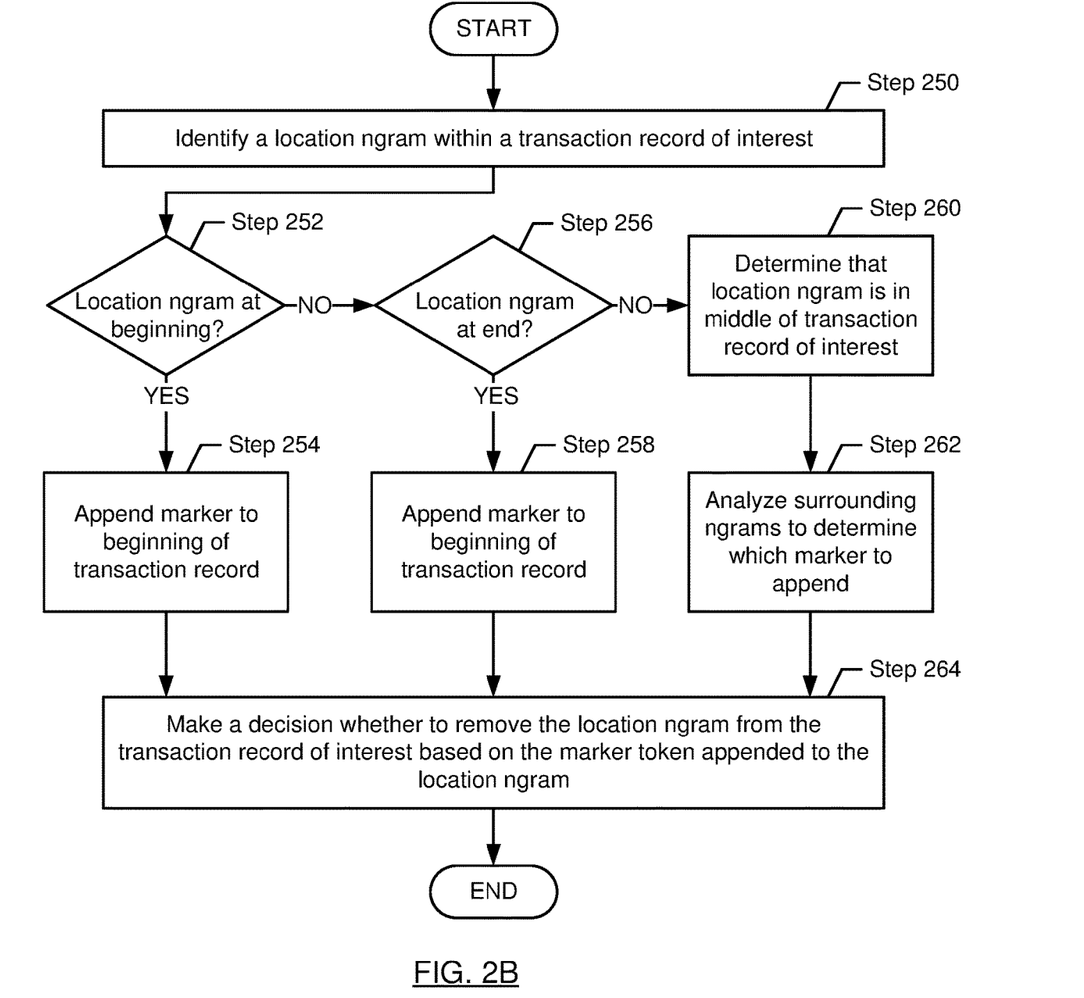
FIG. 2B shows a flowchart in accordance with one or more embodiments of the invention.

FIG. 2A and FIG. 2B show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2A shows a flowchart describing a method for identifying a transaction counterparty in accordance with one or more embodiments of the invention.

In Step 200, a set of transaction records are obtained. The set of transaction records may be obtained from any source. For example, a variety of business entities may use various business management tools provided by a given tool provider. The business management tools may record transactions participated in by the business entities. The tool provider may store and/or have access to such records, and thus obtain the records as a set of transaction records. As another example, transaction records may be obtained directly or indirectly from one or more financial institutions that create and/or maintain transaction records. The set of transaction records may be stored in a transaction record and ngram data store (e.g., 112 of FIG. 1)

In Step 202, a string frequency analysis is applied to the transaction records obtained in Step 200 to identify common distinctive transaction counterparty ngrams within the transaction records. Common distinctive transaction counterparty ngrams identify transaction counterparties (e.g., merchants) that are both common and distinctive within the set of transaction records. Examples of common distinctive transaction counterparties include, but are not limited to: apple, facebook, costco, exxon, mcdonalds, safeway, united, netflix, etc. Within a set of transaction records, ngrams identifying such transaction counterparties will appear more frequently than other ngrams, and, thus, applying a string frequency analysis to the set of transaction records yields a set of common distinctive transaction counterparties. Once the common distinctive transaction counterparties have been identified, the set of transaction records that include a common distinctive transaction counterparty ngram are selected to obtain a set of common distinctive transaction counterparty transaction records. The set of common distinctive transaction counterparty transaction records may be stored in a transaction record and ngram data store (e.g., 112 of FIG. 1).

In Step 204, the common distinctive transaction counterparty ngrams are removed from the transaction records in the set of common distinctive transaction counterparty transaction records obtained in Step 202. The set of ngrams that remain are noise ngrams. The identified noise ngrams may be stored in a transaction record and ngram data store (e.g., 112 of FIG. 1). The common distinctive transaction counterparty ngrams may be removed via any method for removing certain text from text strings. For example, each common distinctive transaction counterpart transaction record may be processed, and the common distinctive transaction counterparty therein may be deleted/removed from the common distinctive transaction counterparty transaction record.

In Step 206, the noise ngrams identified in Step 204 are ordered based on frequency of occurrence. The ordering may be accomplished by determining how many instances of each noise ngram exist within the set of noise ngrams and organizing the noise ngrams based on the number of instances. For example, a list may be generated with the noise ngrams arranged with the highest frequency noise ngram at the top, and the following noise ngrams decreasing in frequency of appearance. Though not shown in FIG. 2A, the ordered list may be processed to determine within a relative confidence level that the identified noise ngrams are not related to identification of transaction counterparties.

Additionally or alternatively, in Step 204, a threshold T may be empirically determined and applied to the combined the set of all common distinctive transaction counterparty transaction records obtained in Step 202, such that elements are included only if they occur in at least T of the sets being combined. In such embodiments of the invention, removal of common distinctive transaction counterparty ngrams (as in Step 204) may not be performed. The result is a set of noise ngrams that are independently shared by at least T common distinctive transaction counterparties.

In Step 208, the portion of the noise ngrams that fall below a frequency threshold and/or are independently shared by at least T common distinctive transaction counterparties are discarded. The frequency threshold is empirically determined and/or configurable as a setting. As an example, observation over time may yield a result determining that noise ngrams that appear 100 or more times within a set of common distinctive transaction counterparty transaction records are higher frequency noise ngrams, and thus the frequency threshold may be set at 100. The set of noise ngrams above the frequency threshold may be referred to as higher frequency noise ngrams, and may be stored in a transaction record and ngram data repository (e.g., 112 of FIG. 1).

In Step 210, a transaction record of interest is obtained. A transaction record of interest may be any transaction record of any entity that participated in a transaction. For example, a business makes purchases using a credit card provided by a financial institution. The business also uses a business management application that obtains transaction records of the business from the financial institution and stores the transaction records. When the business (or the provider of the business management application) wants to analyze the spending patterns of the business, each transaction record will need to be subjected to the analysis described herein to determine the transaction counterparties in the transaction records. That process includes obtaining one of the transaction records of interest.

In Step 212, the transaction record of interest obtained in Step 210 is analyzed to identify higher frequency noise ngrams within the transaction record of interest, and to remove those noise ngrams. In one or more embodiments of the invention, the transaction record of interest is analyzed in such a manner by providing the transaction record of interest as an input to a start state of a finite state machine. The finite state machine will then process the transaction records by identifying higher frequency noise ngrams in the transaction record, and removing the identified higher frequency noise ngram to change the state of the transaction record of interest. Such a process will continue until the transaction record of interest has been checked for all higher frequency noise ngrams, at which point the transaction record of interest will be in a conclusion state of the finite state machine.

As an example, when a given transaction record is provided to a finite state machine, it includes an ngram identifying a transaction counterparty and a number of noise ngrams, including higher frequency noise ngrams. Any regular expression, or portion thereof, implemented by the finite state machine that does not identify a higher frequency noise ngram within the transaction record will keep the transaction record in the same state. Any regular expression, or portion thereof, implemented by the finite state machine that identifies a higher frequency noise ngram in the transaction record changes the state of the transaction record. Specifically, the state of the transaction record changes by the removal of the identified higher frequency noise ngram. This process continues until all higher frequency noise ngrams are removed from the transaction record to obtain a lower noise transaction record. A lower noise transaction record may then be used to automatically identify a transaction counterparty.

Although Step 212 contemplates providing a single transaction record of interest to a finite state machine, any number of transaction records will be provided to the finite state machine in order to perform the various types of analysis that are available once the transaction counterparties of that entity have been properly identified.

In Step 214, a transaction counterparty is identified using the lower noise transaction record of interest obtained in Step 212. In one or more embodiments of the invention, a transaction counterparty is identified by processing a lower noise transaction record to obtain the transaction counterparty. For example, if the identification and removal of higher frequency noise ngrams in Step 214 has removed all noise ngrams from a lower noise transaction record, then the remaining ngrams identify the transaction counter party. As another example, the lower noise transaction record may include ngrams related to the identification of a transaction counterparty and additional noise ngrams that were not higher frequency ngrams. In such a scenario, the lower noise transaction record is subjected to additional processing to differentiate the transaction counterparty ngram(s) from the remaining noise ngrams. For example, if a lower noise transaction record is "Slim's Gas X146=$tr5.3", then the processing of the lower noise transaction record may include comparing remaining ngrams to known words, party names, etc. to determine that the multi-token sequence "Slim's Gas" is a transaction counterparty, while "X146=$tr5.3" is merely a noise ngram.

Once the transaction counterparty for a given lower noise transaction record has been identified, though not shown in FIG. 2A, the process may be repeated for as many transaction records are needed to perform a relevant analysis, such as determining what advertising to target at a given entity based on the transaction counterparties with which the entity engages in transactions.

FIG. 2B shows a flowchart describing a method for marking a location ngram in a transaction record of interest with a marker to determine whether to remove the location ngram in accordance with one or more embodiments of the invention. In one or more embodiments of the invention, the steps of FIG. 2B occur during Step 210 of FIG. 2A when making a decision whether or not to remove a noise ngram from the transaction record of interest to obtain a lower noise transaction record.

In Step 250, a location ngram is identified within a transaction record of interest. As discussed above in the description of FIG. 1, a location ngram is an ngram that is related to a location. In some cases, a location ngram is a location where the transaction occurred, or where the transaction counterparty is headquartered, or any other type of ngram not related to the name of the transaction counterparty. For example, the multi-token subsequence "New York N.Y." may be a location ngram included in a transaction record because the transaction occurred in New York City in New York State. In other cases, a location ngram is all or a portion of the ngram identifying a transaction counterparty. Examples include, but are not limited to: "Florida's" (which is a hypothetical restaurant in Florida), or "Arizona Bicycle Experts" (which is a hypothetical bicycle shop in Arizona). A location ngram may be identified by processing (e.g., parsing) the transaction record of interest and determining if any of the tokens or multi-token subsequences (i.e., ngrams) in the transaction record are related to a location. For example, a noise ngram identifier may have access to a list of known descriptions of locations, and the ngrams of a transaction record of interest may be compared against the list of locations to determine if any ngrams match a location.

In Step 252, a determination is made whether a position of the location ngram identified in Step 250 within the transaction record of interest is at the beginning of the transaction record of interest. If the location ngram is at the beginning of the transaction record of interest, the process proceeds to Step 254. If the location ngram is not at the beginning of the transaction record of interest, then the process proceeds to Step 256.

In Step 254, a first type of marker is inserted at the beginning of the transaction record of interest. The markers may be appended to the adjacent ngrams at the beginning of the transaction record of interest. Example markers include, but are not limited to: "@", "#", "$", "%", "^", etc.

In Step 256, a determination is made whether a position of the location ngram identified in Step 250 within the transaction record of interest is at the end of the transaction record of interest. If the location ngram is at the end of the transaction record of interest, the process proceeds to Step 258. If the location ngram is not at the end of the transaction record of interest, then the process proceeds to Step 260.

In Step 258, a second type of marker is inserted at the beginning of the transaction record of interest. The markers may be appended to the adjacent ngrams at the end of the transaction record of interest.

In Step 260, because the location ngram is not at the beginning or the end of the transaction record of interest, it is determined that the position of the location ngram identified in Step 250 within the transaction record of interest is in the middle of the transaction record of interest, and the process proceeds to Step 262. If the location ngram is not at the end of the transaction record of interest, then the process proceeds to Step 260.

In Step 262, additional processing occurs to determine whether the location ngram is part of the identity of a transaction counter party. For example, if a location ngram is identified in the interior of a transaction record of interest, then the ngrams immediately before and immediately after the location ngram may be analyzed in order to determine if they are likely to be at least part of the identity of a transaction counterparty. If the ngram(s) after the location ngram is part of an identity of a transaction counterparty, then the first type of marker is appended to the beginning of the location ngram. If the ngram(s) before the location ngram is part of an identity of a transaction counterparty, then the second type of marker is appended to the end of the location ngram.

In Step 264, a decision is made whether to remove the location ngram from the transaction record of interest as a noise ngram. In one or more embodiments of the invention, if the location ngram is at the beginning of the transaction record of interest and has the first type of marker appended, then the location ngram is a portion of the identity of the transaction counterparty, and thus not removed. In one or more embodiments of the invention, if the location ngram is at the end of the transaction record of interest, then the location ngram is a noise ngram, and thus removed. In other embodiments of the invention, the location ngram is neither at the beginning or the end of the transaction record of interest (i.e., in the interior of the transaction of interest), then the location record is not removed if the first type of marker is appended, and removed if the second type of marker is appended. After Step 264, the process ends.

Figure 3A:
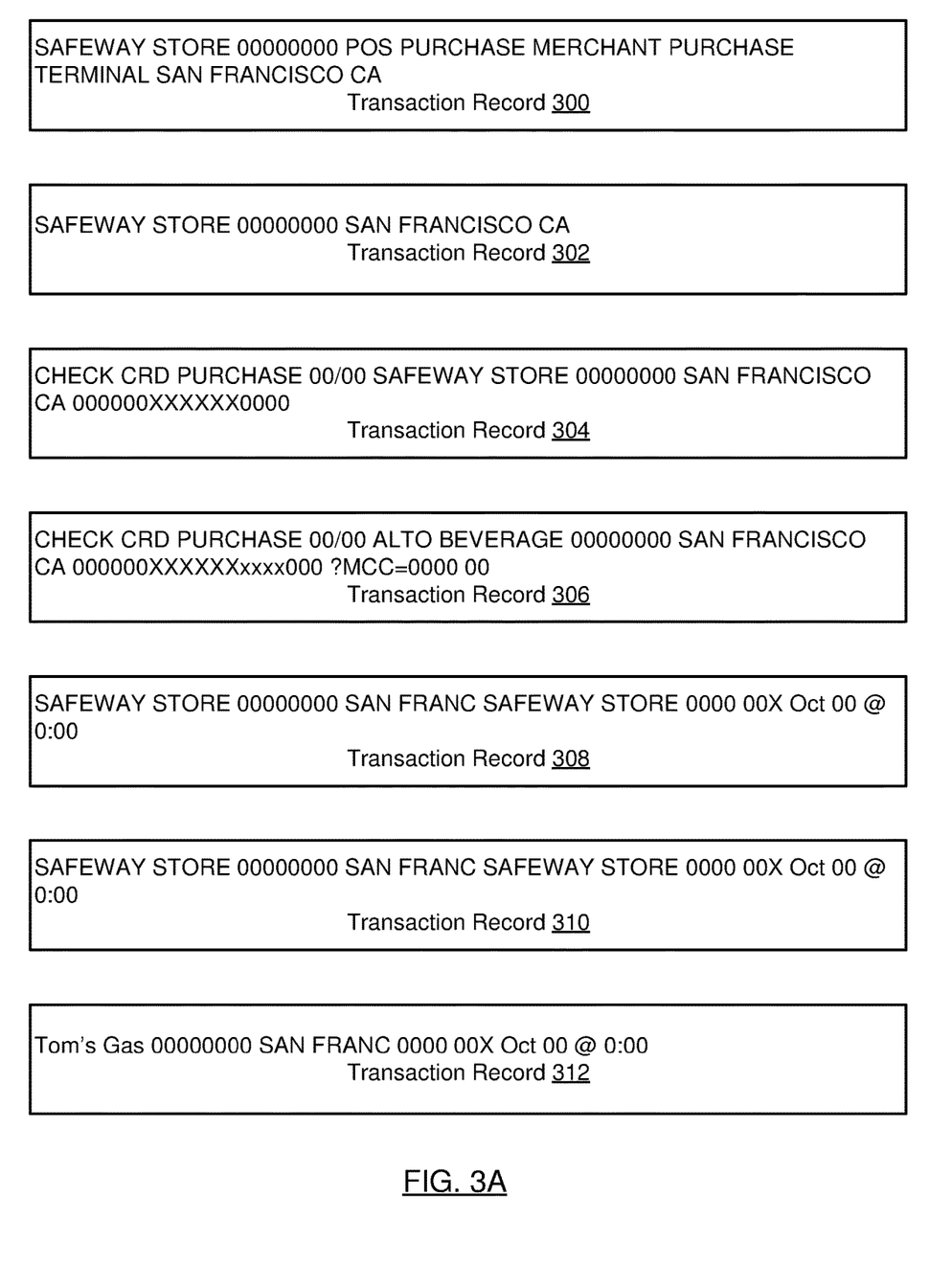
FIG. 3A and FIG. 3B show an example in accordance with one or more embodiments of the invention.
Figure 3B:
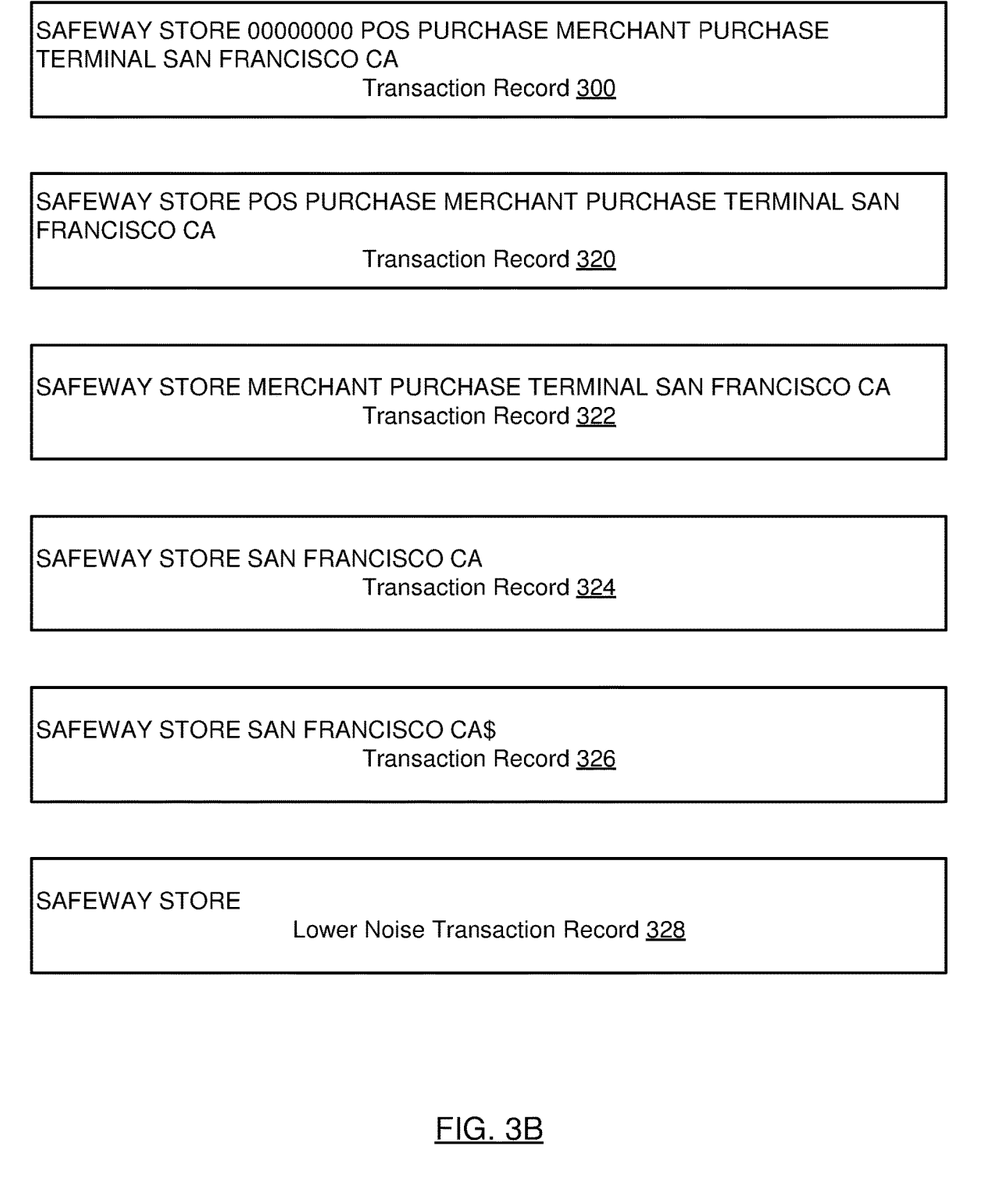

FIG. 3A and FIG. 3B show an example in accordance with one or more embodiments of the invention. The following example is for explanatory purposes only and not intended to limit the scope of the invention.

Referring to FIG. 3A, consider a scenario in which a set of transaction records have previously been obtained and a set of common distinctive transaction counterparty transaction records have been identified within the set of transaction records (as described above in Step 200 and Step 202 of FIG. 2A).

Additionally, common distinctive transaction ngrams have been removed, leaving a set of noise ngrams (as described above in Step 204 of FIG. 2A). Finally, a set of higher frequency noise ngrams has been identified within the set of noise ngrams (as described above in Step 206 and Step 208 of FIG. 2A). Among the higher frequency noise ngrams previously identified are "00000000", "POS PURCHASE", and "MERCHANT PURCHASE TERMINAL". Additionally, "SAN FRANCISCO CA" has been identified as a location ngram.

In such a scenario, a set of transaction records, including transaction records of interest (300-312) have been obtained in order to analyze the spending habits of a consumer at a store called Safeway Store. In order to perform the analysis, a transaction record of interest (300) is provided as input to a finite state machine in order to remove higher frequency noise ngrams.

Turning to FIG. 3B, transaction record (300) is provided as input to a finite state machine constructed to implement regular expressions for each of the identified higher frequency noise ngrams. Transaction record 300 remains in the start state until the finite state machine implements a regular expression to check for "00000000", which is within transaction record (300). The higher frequency noise ngram "00000000" is removed from transaction record (300), thus changing the state of the transaction record to obtain transaction record (322).

Next, transaction record (322) remains in the same state until the finite state machine implements a regular expression to check for "POS PURCHASE", which is within transaction record (322). The higher frequency noise ngram "POS PURCHASE" is removed from transaction record (322), thus changing the state of the transaction record to obtain transaction record (324).

Next, transaction record (324) remains in the same state until the finite state machine implements a regular expression to check for "MERCHANT PURCHASE TERMINAL", which is within transaction record (324). The higher frequency noise ngram "MERCHANT PURCHASE TERMINAL" is removed from transaction record (324), thus changing the state of the transaction record to obtain transaction record (326).

Next, transaction record (326) is determined to include the location ngram "SAN FRANCISCO CA". A determination is made that the location ngram is at the end of the transaction record, and, thus, the marker "$" is appended to the end of the location ngram, as shown in transaction record (326).

Next, because the location ngram has the marker "$" appended, it is removed from the transaction record (326) to obtain the lower noise transaction record (328), which identifies "SAFEWAY STORE" as the transaction counterparty. Therefore, this transaction record is relevant to the analysis of a consumer's spending habit at Safeway Store.

Returning to FIG. 3A, a similar analysis (i.e., in accordance with FIG. 2A and FIG. 2B, above) is applied to transaction records (302-312) to identify the transaction counterparties in each transaction record. In this manner, Safeway Store is identified as the transaction counterparty for transaction record (302), transaction record (304), transaction record (308), and transaction record (310). The transaction counterparty identified for transaction record (306) is Alto Beverage, and the transaction counterparty identified for transaction record (312) is Tom's Gas. Therefore, transaction record (300), transaction record (302), transaction record (304), transaction record (308), and transaction record (310) are included in the analysis of a consumer's spending habits at Safeway Store, while transaction record (306) and transaction record (312) are excluded.

Figure 4A:
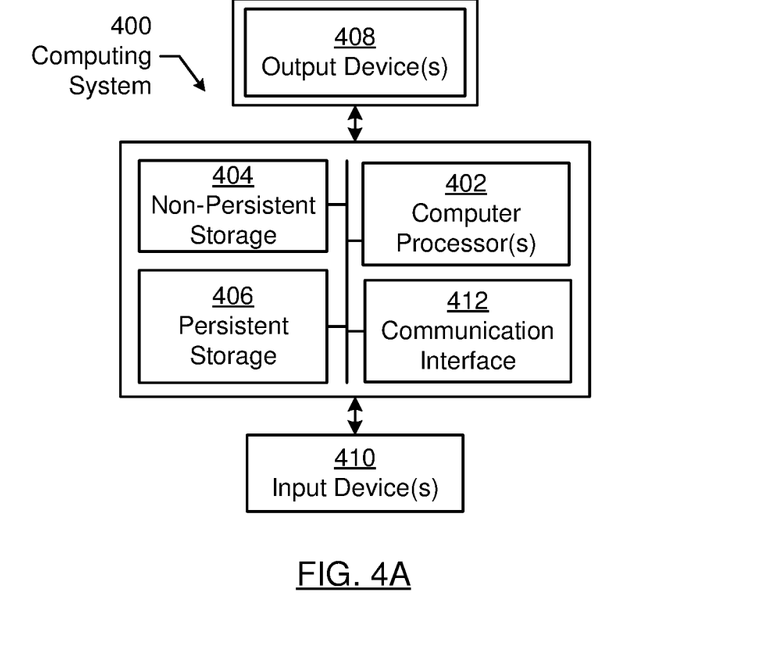
FIG. 4A shows a computing system, in accordance with one or more embodiments of the invention.

Embodiments of the invention may be implemented on a computing system (e.g., computing device). Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
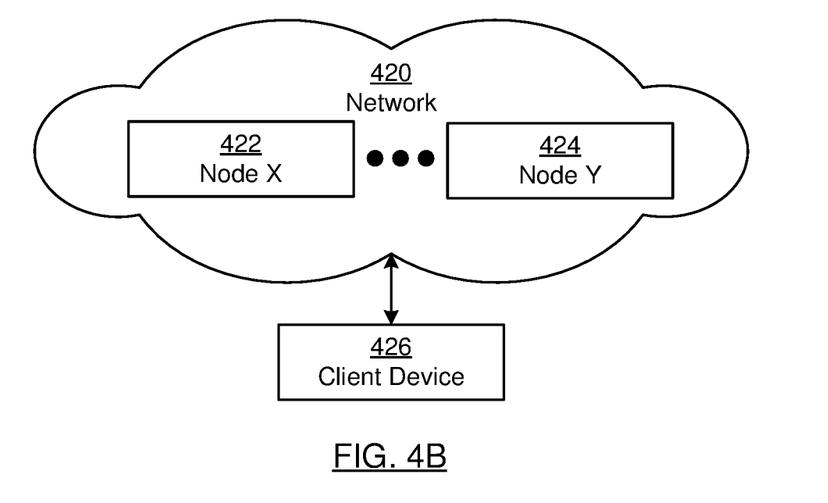
FIG. 4B shows a group of computing systems, in accordance with one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process.

Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B).

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for removing noise ngrams from transaction records, comprising:
    obtaining a plurality of noise ngrams, each of the plurality of noise ngrams comprising noise words removable from the transaction records, each of the noise words comprising a defined consecutive sequence, of at least one of letters or numbers;
    ordering the plurality of noise ngrams based on frequency of occurrence;
    discarding a portion of the plurality of noise ngrams below a frequency threshold to obtain a higher frequency subset of the plurality of noise ngrams;
    obtaining a transaction record of interest;
    identifying a portion of the higher frequency subset within the transaction record of interest to form an identification;
    based on a characteristic of a position of a location ngram within the transaction record of interest, inserting a marker token in the transaction record of interest;
    appending the marker token to a location ngram within the transaction record of interest;
    making a decision, based on the marker token being appended to the location ngram, whether to remove the ngram from the transaction record of interest;
    removing, after making the decision and based on the identification, the portion of the higher frequency subset from the transaction record of interest to create a modified transaction record; and
    processing the modified transaction record.

2. The method of claim 1, wherein obtaining the plurality of noise ngrams comprises:
    obtaining a plurality of transaction records;
    applying a string frequency analysis to the plurality of transaction records to obtain a plurality of common distinctive transaction counterparty transaction records corresponding to a plurality of common distinctive transaction counterparties identified by a plurality of common distinctive transaction counterparty ngrams;
    removing the plurality of common distinctive transaction counterparty ngrams from the plurality of common distinctive transaction counterparty transaction records to obtain a plurality of strings without common distinctive transaction counterparty ngrams; and extracting from the plurality of strings the plurality of noise ngrams.

3. The method of claim 1, wherein the characteristic is one selected from a group consisting of the beginning of the transaction record of interest and the end of the transaction record of interest.

4. The method of claim 1, further comprising identifying a transaction counterparty using the transaction record of interest with the portion of the higher frequency subset removed, wherein the identified transaction counterparty is used as part of an analysis of an activity of a second party to a transaction recorded by the transaction record of interest.

5. A system, comprising:
a processor;
a memory comprising instructions for execution on the processor;
a transaction record and ngram data repository operatively connected to the memory and the processor;
a threshold analyzer operatively connected to the transaction record and ngram data repository, stored in the memory, executing on the processor, and configured to:
obtain a plurality of noise ngrams, each of the plurality of noise ngrams comprising noise words removable from the transaction records, each of the noise words comprising a defined consecutive sequence, of at least one of letters or numbers;
order the plurality of noise ngrams based on frequency of occurrence; and
discard a portion of the plurality of noise ngrams below a frequency threshold to obtain a higher frequency subset of the plurality of noise ngrams; and
a noise ngram identifier operatively connected to the threshold analyzer and the transaction record and ngram data repository, stored in the memory, executing on the processor, and configured to:
obtain a transaction record of interest;
identify a portion of the higher frequency subset within the transaction record of interest to form an identification;
remove, based on the identification, the portion from the transaction record of interest to obtain a lower noise transaction record of interest;
identify a transaction counterparty using the lower noise transaction record of interest; and
process the lower noise transaction record of interest with respect to the transaction counterparty identified; and
a position marker executing on the processor and configured to, before removing the portion from the transaction record of interest:
based on a characteristic of a position of a location ngram within the transaction record of interest, insert a marker token in the transaction record of interest;
append the marker token to a location ngram within the transaction record of interest; and
make a decision, based on the marker token being appended to the location ngram, whether to remove the ngram from the transaction record of interest.

6. The system of claim 5, further comprising a string frequency analyzer executing on the processor and configured to:
obtain a plurality of transaction records from the transaction record and ngram data store;
apply a string frequency analysis to the plurality of transaction records to obtain a plurality of common distinctive transaction counterparty transaction records corresponding to a plurality of common distinctive transaction counterparties identified by a plurality of common distinctive transaction counterparty ngrams;
remove the plurality of common distinctive transaction counterparty ngrams from the plurality of common distinctive transaction counterparty transaction records to obtain a plurality of strings without common distinctive transaction counterparty ngrams;
extract from the plurality of strings the plurality of noise ngrams; and
provide the plurality of noise ngrams to the threshold analyzer.

7. The system of claim 5, wherein the noise ngram identifier is further configured to:
construct a regular expression based on the higher frequency subset;
construct a finite state machine based on the regular expression;
provide the transaction record of interest as an input for the finite state machine; and
execute the finite state machine.

8. The system of claim 7, wherein the noise ngram identifier is further configured to remove the portion from the transaction record of interest by removing a higher frequency ngram of the higher frequency subset to transition the transaction record of interest from a first state of the finite state machine to a second state of the finite state machine.

9. The system of claim 5, wherein the characteristic is one selected from a group consisting of the beginning of the transaction record of interest and the end of the transaction record of interest.

10. The system of claim 5, wherein the identified transaction counterparty is used as part of an analysis of an activity of a second party to a transaction recorded by the transaction record of interest.

11. A non-transitory computer readable medium comprising instructions that, when executed by a computer processor, perform a method comprising:
obtaining a plurality of noise ngrams, each of the plurality of noise ngrams comprising noise words removable from the transaction records, each of the noise words comprising a defined consecutive sequence, of at least one of letters or numbers;
ordering the plurality of noise ngrams based on frequency of occurrence;
discarding a portion of the plurality of noise ngrams below a frequency threshold to obtain a higher frequency subset of the plurality of noise ngrams;
obtaining a transaction record of interest;
identifying a portion of the higher frequency subset within the transaction record of interest to form an identification;
based on a characteristic of a position of a location ngram within the transaction record of interest, inserting a marker token in the transaction record of interest;
appending the marker token to a location ngram within the transaction record of interest;
making a decision, based on the marker token being appended to the location ngram, whether to remove the ngram from the transaction record of interest;
removing, after making the decision and based on the identification, the portion from the transaction record of interest to create a modified transaction record; and
processing the modified transaction record.

12. The non-transitory computer readable medium of claim 11, wherein obtaining the plurality of noise ngrams comprises:
- obtaining a plurality of transaction records;
- applying a string frequency analysis to the plurality of transaction records to obtain a plurality of common distinctive transaction counterparty transaction records corresponding to a plurality of common distinctive transaction counterparties identified by a plurality of common distinctive transaction counterparty ngrams;
- removing the plurality of common distinctive transaction counterparty ngrams from the plurality of common distinctive transaction counterparty transaction records to obtain a plurality of strings without common distinctive transaction counterparty ngrams; and
- extracting from the plurality of strings the plurality of noise ngrams.

13. The non-transitory computer readable medium of claim 11, wherein identifying the portion of the higher frequency subset comprises:
- constructing a regular expression based on the higher frequency subset;
- constructing a finite state machine based on the regular expression;
- providing the transaction record of interest as an input for the finite state machine; and
- executing the finite state machine.

14. The non-transitory computer readable medium of claim 12, wherein removing the portion from the specific transaction record comprises removing a higher frequency ngram of the higher frequency subset to transition the transaction record of interest from a first state of the finite state machine to a second state of the finite state machine.

15. The non-transitory computer readable medium of claim 11, wherein the characteristic is one selected from a group consisting of the beginning of the transaction record of interest and the end of the transaction record of interest.

16. The non-transitory computer readable medium of claim 11, the method further comprising further comprising identifying a transaction counterparty using the transaction record of interest with the portion of the higher frequency subset removed, wherein the identified transaction counterparty is used as part of an analysis of an activity of a second party to a transaction recorded by the transaction record of interest.

17. The method of claim 1 wherein identifying the portion of the higher frequency subset comprises:
- constructing a regular expression based on the higher frequency subset;
- constructing a finite state machine based on the regular expression;
- providing the transaction record of interest as an input to the finite state machine; and
- executing the finite state machine.

18. The method of claim 17, wherein removing the portion from the transaction record of interest comprises removing a higher frequency ngram of the higher frequency subset to transition the transaction record from a first state of the finite state machine to a second state of the finite state machine.

* * * * *

UNITED STATES PATENT AND TRADEMARK OFFICE
CERTIFICATE OF CORRECTION

PATENT NO. : 10,546,348 B1  
APPLICATION NO. : 15/408241  
DATED : January 28, 2020  
INVENTOR(S) : Christopher Lesner et al.

Page 1 of 1

It is certified that error appears in the above-identified patent and that said Letters Patent is hereby corrected as shown below:

In the Claims

Claim 16, Column 22, Line 8, the line reads "… claim 11, the method further comprising further comprising …" but should read -- … claim 11, the method further comprising … --.

Signed and Sealed this  
Sixteenth Day of June, 2020

Andrei Iancu  
*Director of the United States Patent and Trademark Office*